United States Patent [19]

Fielding

[11] Patent Number: 4,498,635
[45] Date of Patent: Feb. 12, 1985

[54] MATERIAL DISPENSING MACHINE

[75] Inventor: Randy L. Fielding, Fremont, Ohio

[73] Assignee: Christy Machine Company, Fremont, Ohio

[21] Appl. No.: 442,599

[22] Filed: Nov. 18, 1982

[51] Int. Cl.³ .............................................. B02C 17/02
[52] U.S. Cl. ..................................... 241/94; 241/283; 222/200; 222/565; 222/278
[58] Field of Search ............... 222/189, 200, 269, 275, 222/310, 333, 409, 565, 561, 559, 342, 278; 241/94, 283; 209/360, 366; 198/533; 99/623

[56] References Cited

U.S. PATENT DOCUMENTS

| 788,429 | 4/1905 | Ruf | 241/94 |
| 2,432,852 | 12/1947 | Arvidson | 222/409 |
| 3,874,641 | 4/1975 | Tolan | 222/200 |

FOREIGN PATENT DOCUMENTS

| 170377 | 2/1905 | Fed. Rep. of Germany | 241/94 |
| 382625 | 9/1922 | Fed. Rep. of Germany | 222/409 |
| 997386 | 1/1952 | France | 222/181 |
| 704346 | 2/1954 | United Kingdom | 198/533 |

Primary Examiner—H. Grant Skaggs
Attorney, Agent, or Firm—Maky, Renner, Otto & Boisselle

[57] ABSTRACT

A machine for dispensing dry and moist materials including those which are self-adhering and/or compactible or which tend to agglomerate comprising a material dispensing chute formed at its sides by horizontally reciprocating, expanded metal grid plates which engage and separate material from adjacent material pressing thereagainst for passage through the grids of the plates and metered depositation onto articles or products passing therebeneath. The grid plates have horizontally spaced, downwardly converging upper portions forming a V where the majority of material is separated and horizontally spaced, parallel lower portions forming a narrow transverse width channel which prevents material from loading up between the grid plates in the V, such giving the chute a generally Y-shape in transverse cross-section. Depending on the material being dispensed, the grid plates may be formed from either flat or raised expanded metal grid material preferably having a diamond grid pattern that enhances material separation through a funneling or wedging effect. The grid plates are desirably reciprocated in respective top and bottom tracks by eccentrics in a direction opposite each other for more uniform discharge of material. Either grid plate may be fixed and/or replaced by a solid or part solid/part grid plate, the latter providing a narrower width discharge pattern. Also provided is a power drive motor mount which permits quick and easy removal of the motor to allow cleaning of the machine without subjecting the motor to the cleaning environment.

29 Claims, 10 Drawing Figures

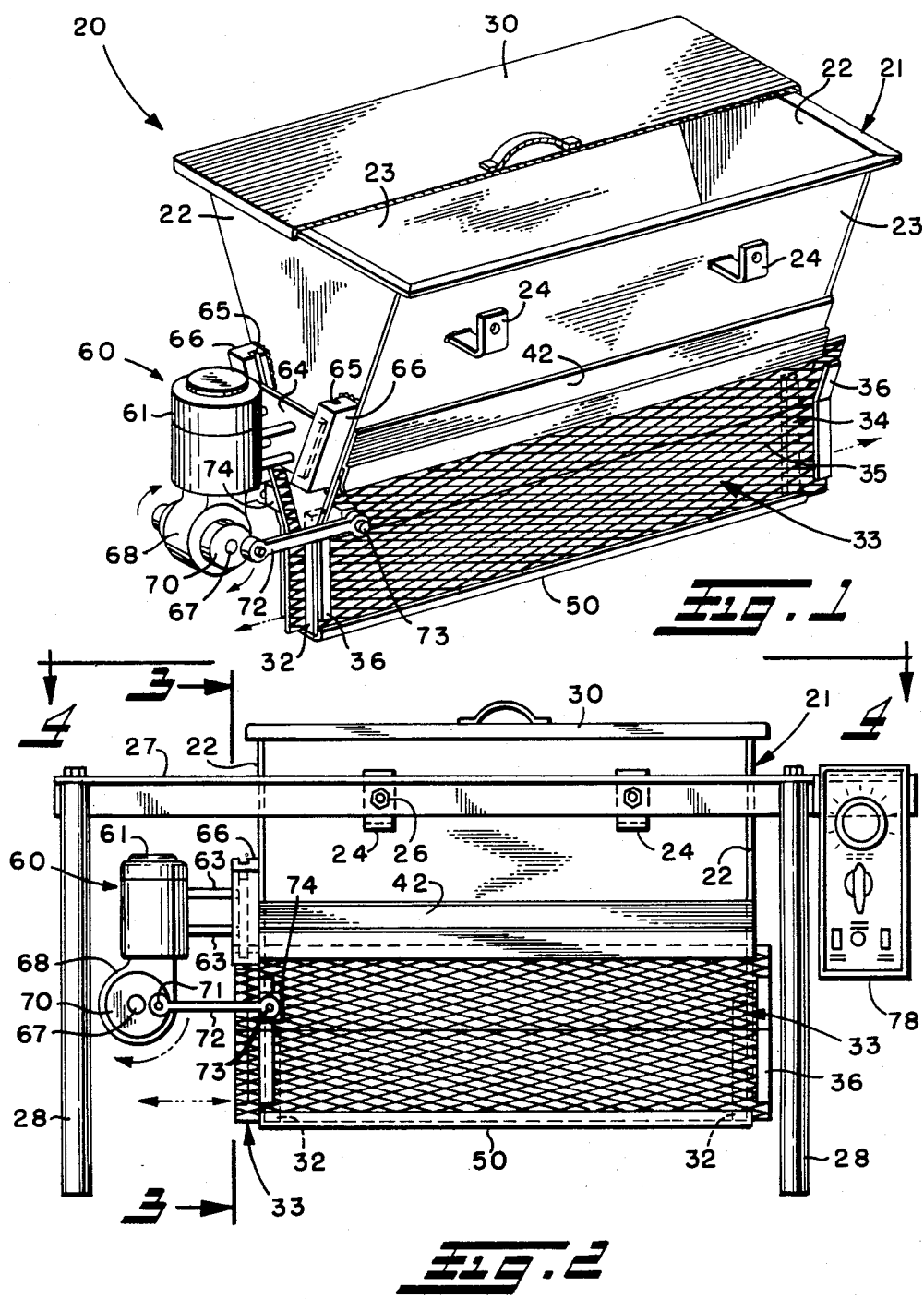

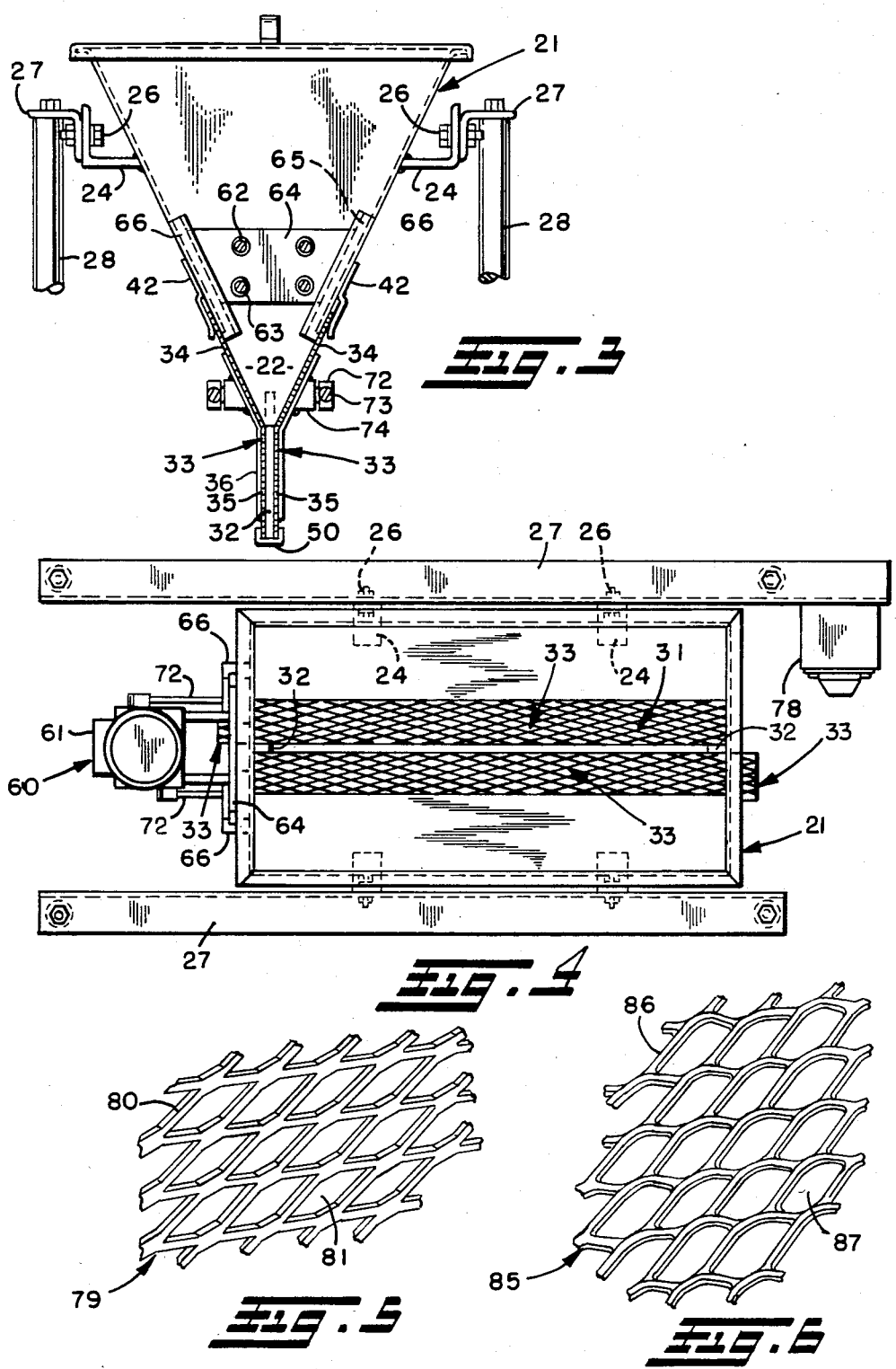

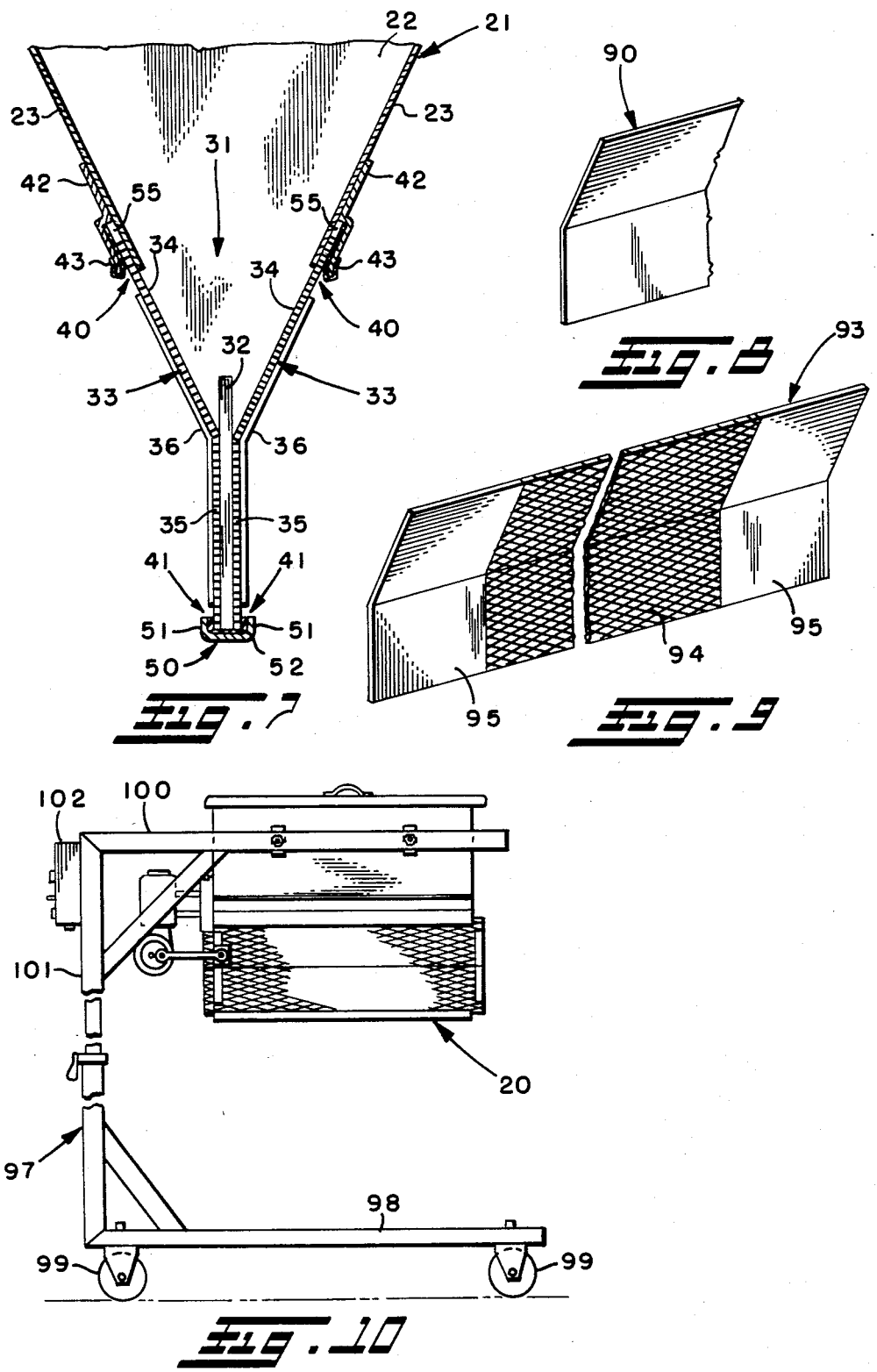

MATERIAL DISPENSING MACHINE

This invention relates generally to a material dispensing machine and, more particularly, to a machine especially designed for dispensing moist materials including those which are self-adhering and/or compactible or which tend to agglomerate.

BACKGROUND

Heretofore, machines have been used for dispensing various forms of substantially dry, flowable material as by sprinkling or dispersion. Such machines are particularly useful in the processed food preparation industry for dispensing salt, sugar, seeds, garnishing, decorative coatings, etc., onto food products passing or conveyed beneath the dispensing machine. An example of one such machine is disclosed in U.S. Pat. No. 3,637,112 issued to Daniel Lamar Christy on Jan. 25, 1972.

Also known are machines intended for use in dispensing self-adhering and/or compactible materials. In U.S. Pat. No. 2,772,053, for example, there is disclosed a granulator that employs vertically reciprocating and stepped granulating members for crushing and grinding granular material which subsequently drops through the mesh of such members. Also, U.S. Pat. No. 4,288,314 discloses an apparatus employing a pair of planar friction members mounted in downwardly converging, facing relation for independent elevational movements to receive and separate clumps of fruit therebetween.

Other machines also known as granulators have been provided to grate or separate whole material into granules. In U.S. Pat. No. 788,429, there is disclosed a granulator of this type which employs two horizontally reciprocating grates arranged in a V to granulate roots, drugs and the like.

SUMMARY OF THE INVENTION

The present invention provides a novel machine for dispensing a wide variety of dry and moist materials including those which are self-adhering and/or compactible or which tend to agglomerate. The machine separates and delivers the material in a uniform and regulated flow for deposition on receiving articles or products passing therebeneath. Examples of such moist or self-adhering materials that can readily and easily be dispensed with the machine of the present invention are various moist food toppings including wet onions, streusel topping, powdered sugar, potato flakes, and coconut. In addition, other self-adhering or compactible non-food items or materials ranging in consistency from powder to dry pastes and resins may readily be dispensed using such machine.

Briefly, the machine comprises a material dispensing chute formed at its sides by oscillating, expanded metal grid plates which engage and separate material from adjacent material pressing thereagainst for passage through the grids of the plates and uniform and regulated depositation onto articles or products passing therebeneath. The grid plates have horizontally spaced, downwardly converging upper portions generally forming a V where the majority of material is separated and horizontally spaced, parallel lower portions forming a narrow transverse width, closed bottom channel which prevents material from loading up between the grid plates in the V, such giving the chute a generally Y-shape in transverse cross section and ensuring consistency and continuity of the dispensing action. Depending on the material being dispensed, the grid plates may be formed from either flat or raised expanded metal grid material to provide for a lesser or greater amount of shearing or shredding of the material passing between the grid plates. Also, the grid plates preferably have a diamond grid pattern that enhances material separation through a funneling or wedging effect.

In a preferred form, the grid plates are reciprocated in respective top and bottom tracks by eccentrics in a direction opposite each other for more uniform discharge of material. Alternatively, one of the grid plates may be stationary and/or either grid plate may be replaced by a solid or part-solid/part-grid plate, the latter providing a narrower width discharge pattern. Also provided is a power drive motor mount which permits quick and easy removal of the motor to allow cleaning of the machine without subjecting the motor to the cleaning environment.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a perspective view of a preferred form of material dispensing machine according to the invention;

FIG. 2 is a front elevational view of the dispensing machine of FIG. 1 which also shows one exemplary manner of mounting the machine for use in conjunction with a product conveyor line;

FIG. 3 is a vertical section through the machine of FIG. 2 taken substantially along the line 3—3 thereof;

FIG. 4 is a top plan view of the machine of FIG. 2 as seen from the line 4—4 thereof;

FIG. 5 is a fragmentary perspective view showing a preferred form of flat expanded metal grid material;

FIG. 6 is a fragmentary perspective view showing a preferred form of raised expanded metal grid material;

FIG. 7 is an enlarged, fragmentary transverse vertical section through the machine of FIG. 2;

FIG. 8 is a reduced, fragmentary perspective view showing a solid chute plate having application in the machine of FIG. 1;

FIG. 9 is a reduced, fragmentary perspective view showing a part-solid/part-grid chute plate having application in the machine of FIG. 1; and FIG. 10 is a front elevational view showing an exemplary portable mounting arrangement for the machine of FIG. 1.

DETAILED DESCRIPTION

Referring now in detail to the drawings and initially to FIG. 1, a preferred form of material dispensing machine according to the invention is designated generally by reference numeral 20 and comprises a hopper 21 for receiving material to be dispensed. The hopper 21 includes end walls 22 and side walls 23 and may be mounted to a suitable support structure or frame by transversely spaced pairs of L-shape brackets or lugs 24 secured as by welding to the side walls 23.

As seen in FIGS. 2-4, the brackets 24 on opposite side walls 23 may be secured by fasteners 26 to respective horizontal rails 27 mounted at their ends atop vertical support rods or posts 28 which, for example, may straddle a conveyor (not shown) passing beneath the machine. As will be appreciated, the conveyor may carry articles or products onto which material may be dispensed by the machine in the manner hereinafter described.

The illustrated hopper 21, being generally V-shape in transverse cross-section by reason of downwardly converging side walls 23, has a large area open top end which may be closed as desired by a cover 30. The hopper also has a smaller area, bottom or discharge end opening to a chute 31 (see FIGS. 4 and 7). The ends of the chute 31 are closed by the lower or apex ends of the end walls 22 and depending spacer bars 32 secured to respective end walls, whereas the sides of the chute are formed by side or grid plates 33. The grid plates have horizontally spaced, downwardly converging upper portions 34 and horizontally spaced, parallel lower portions 35 thus giving the chute a generally Y-shape in transverse cross-section. The grid plates also are desirably provided with vertical stiffening bars or strips 36 at each vertical edge thereof which help support and maintain the shape of the grid of each plate.

As best seen in FIG. 7, the grid plates 33 are supported top and bottom for horizontal movement in top and bottom guide channels or tracks 40 and 41. The top track 40 for each grid plate is formed by a horizontal guide piece 42 having an upper portion secured as by welding to the respective side wall 23 of the hopper 21. At its lower portion, the guide piece is spaced outwardly from the hopper side wall to form therewith a downwardly opening, inclined slot for receipt of the correspondingly inclined upper peripheral edge portion of the respective grid plate 33. To reduce friction during sliding movement of the grid plate in the top track or slot 40, a strip of anti-friction tape 43 such as Teflon tape may be affixed to the inside surface of each guide piece 42 at the lower outwardly spaced portion thereof.

The bottom track 41 for each grid plate 33 is desirably formed by a common U-shape channel piece 50 secured at its ends to the bottom ends of the spacer bars 32. As seen in FIG. 7, the upwardly extending legs 51 of the channel piece 50 confine the bottom peripheral edge portions of the grid plates 33 against outward movement whereas the spacer bars 32 disposed between the grid plates at corresponding ends of the hopper serve to maintain the indicated horizontal spacing of the parallel lower portions 35 of the grid plates. As also seen in FIG. 7, a strip of anti-friction tape 52 such as Teflon tape may be affixed to the inside surface of the channel piece 50 to provide reduced friction between the bottom and side bearing surfaces of the channel piece and the bottom edge portions of the grid plates.

The grid plates 33 may be easily installed on and removed from the hopper simply by sliding the same endwise into or out of their respective tracks 40 and 41. Alternatively, the grid plates may be transversely installed and removed by providing sufficient vertical clearance 55 in the top tracks 40 to enable each grid plate to be lifted out of the bottom track 41. Once clear of the bottom track, the grid plate may be pivoted slightly outwardly and dropped out of the top track, and then transversely moved away. To facilitate insertion and removal of the upper edge portion of the grid plate in the top channel 40, guide piece 42 may be slightly outwardly flared along its lower edge as indicated.

The grid plates 33 may be reciprocally driven in the top and bottom tracks 40 and 41 by a power drive indicated generally at 60 in FIGS. 1, 2 and 4. As shown, the power drive includes an electric motor 61 which may be mounted by bolts 62 (see FIG. 3) extending through spacers 63 to a vertical wedge plate 64. The wedge plate 64 has a generally truncated V-shape for wedged receipt in opposed slots 65 in inclined wedge slide blocks 66 secured as by welding to one of the end walls 22 of the hopper 21. As will be appreciated, after the motor has been disconnected from the grid plates, the motor can be easily and quickly demounted from the hopper simply by lifting the same and thus the wedge plate 64 out of the slots 65 in the wedge blocks 66. This greatly facilitates cleaning of the machine in that it avoids having to subject the motor to the cleaning environment.

The illustrated motor 60 is of the type having two speed reduced drive shafts 67 which extend in opposite directions out of the motor gear head 68. With the motor oriented as shown, the drive shafts also extend transversely with respect to the grid plates 33. Secured to each drive shaft 67 is a respective disc 70 provided with an eccentric crank pin 71 to which one end of a respective tie rod 72 is connected. The other end of each tie rod 72 is connected, preferably by a quick connect/disconnect mechanism, to a pin 73 exending transversely outwardly from a mounting block 74 secured to a respective grid plate 33.

Upon operation of the motor 60, the grid plates 33 will be reciprocally driven by their respective eccentrics 71 and tie rods 72 horizontally along their parallel lines of movement. The eccentrics or crank pins 71 associated with respective grid plates 33 are 180° offset or out of phase so that the grid plates move in a direction opposite each other as indicated for more uniform deposition of the material being dispensed on the articles passing therebeneath, as more fully described hereafter. To control the motor operation and to allow for variation of the speed at which such grid plates reciprocate, a suitable motor control 78 may be provided and conveniently mounted, for example, on one of the horizontal rails 27 as seen in FIGS. 2 and 4.

When the machine 20 is in operation, the power drive 60 continuously drives the grid plates 33 in their described counter-reciprocating movements, as indicated by arrows. Material loaded into the hopper 21 through the open top thereof will be urged gravitationally downwardly into the chute 31 and against the reciprocating grid plates. The steepness of the hopper side walls 23 and the vibrating action of the grid plates assure a constant feed and prevent hang-up of the material in the hopper. As the grid plates reciprocate, they engage the material pressing thereagainst and cause such material to separate from adjacent material. The reciprocating or oscillating action of the grid plates will dispense or shear and refine the material until it is reduced sufficiently in size for passage through the openings in the grid plates. The material passing through the grid plates falls therefrom for deposition onto articles or products passing therebeneath.

The majority of material will be separated by the downwardly converging upper portions 34 of the grid plates 33 forming the V-shape upper portion of the chute 31. That material not sufficiently refined by the upper portions of the grid plates for passage therethrough, such as large clumps that are particularly resistant to separation, will settle downwardly to and into the chute formed between the closely spaced, parallel lower portions 35 of the grid plates which is closed at its bottom by the channel piece 50. As such material passes through the channel, it will be subjected to a more severe separating or shearing action because of the reduced space accommodating the same, and once sufficiently refined, pass through the grids for deposition therebeneath. Accordingly, the narrow channel at the bottom of the chute prevents material from loading up between the grid plates at the V or upper portions thereof so as not to adversely affect the continuity and consistency of the dispensing action.

The material discharge flow may be selectively metered by varying the speed of the power drive 60 which correspondingly varies the reciprocating speed of the grid plates 33. The faster the grid plates reciprocate, normally the faster the material will be separated by and discharged from the grid plates. Because the grid plates reciprocate in opposite directions, a more uniform flow pattern will result. As will be appreciated, the dispensing rate also is a function of the grid size and type.

Having described the overall construction and operation of the machine 20, particular reference is now had to FIGS. 5 and 6 which show preferred forms of expanded metal grid material from which the grid plates 33 are preferably made. Such expanded metal grid material generally is formed by slitting a solid metal sheet and then stretching the sheet to many times its original dimension. Such grid material may be bent along an intermediate horizontal line as indicated to provide the illustrated transverse shape of the plates and bond sheared and de-burred at its edges. As will be appreciated, expanded metal grid or grating material is widely available in various forms and types. Preferably, the grid material is formed from polished stainless steel for easy cleaning and longer life, and for easier passage of material through the openings in the grid material.

For separating and dispensing dryer, more freely flowing materials, a "flat" expanded metal grid material having a "diamond" pattern like that shown at 79 in FIG. 5 is preferred. As in any "flat" expanded metal grid material, the strands 80 thereof reside in a common plane, i.e., the strand thickness is substantially equal to the overall thickness of the material. The strands 80 define therebetween pockets or openings 81 which capture material pressing against the grid material 79 and cause the same to separate from adjacent material as the grid plate and bulk of material move relative to one another. The material in the chute 31 thus will be continuously refined for passage through the grid openings.

As noted, the grid material 79 preferably has a diamond pattern as illustrated with the axes thereof preferably oriented horizontally and upwardly. As the material is urged downwardly by gravity into the grid openings, it will be funneled into or wedges in the V's of the openings 81. By reason of this funneling or wedging action, separation or refinement of the material is greatly enhanced.

In FIG. 6, there is shown at 85 a standard or "raised" expanded metal grid material which is preferred for separating and dispensing moist or wet compacted material. The strands 86 of the material are bent out of the grid material plane and provide on one side of each opening 87 a protruding cutting edge for shearing or grating or refining of material in one direction only. As in any raised expanded metal grid or grate material, the strand thickness thereof is less than the overall thickness of the material.

The amount of material refinement and uniformity of the material discharge pattern depends in large part on the grid opening size. The smaller the openings, the greater the refinement and uniformity. With some materials, such as streusel food topping, the discharge pattern desirably is not too uniform. Accordingly, a raised expanded metal grid material having large openings would then be preferred. In any event, the expanded metal grid material can be varied to accommodate needs and uses for dispensing such materials as coconut, onions, powdered sugar, donut sugar and other self-adhering or compactible materials or ingredients including non-edible materials such as plaster of paris, carbon black and chemicals.

Reference now being had to various adaptations of the machine 20, it first is noted that either one of the grid plates 33 may if desired be fixed or stationary while the other is reciprocated by the power drive 60. Material would still pass through both grid plates, although the separation effect will be substantially greater at the reciprocating grid plate. This would result in a less uniform material discharge pattern which may be desirable in certain applications.

It also may be desirable in certain applications to restrict material discharge at one of the grid plates 33. In this case, such one grid plate may be replaced by a stationary, unperforated or solid plate of the type seen at 90 in FIG. 8.

In other applications, a more narrow width discharge pattern may be desired, which readily may be obtained by replacing each grid plate 33 with a part solid/part grid plate of the type seen at 93 in FIG. 9. Such plate 93 may have a center grid portion 94 and solid or unperforated end portions 95. Accordingly, material will only be refined by and deposited from the center grid portion 94 thereof.

Referring now to FIG. 10, another mounting arrangement for the materal dispensing machine 20 is illustrated. Such arrangement includes a portable, generally C-frame dolly 97 for easy location or relocation of the machine. The dolly includes a base frame 98 to which rollers or casters 99 are secured and a top frame 100 for mounting of the machine thereon. The top and base frames are maintained in vertically spaced parallel relation by a side frame 101 which may be vertically adjusted for proper positioning of the machine over a conveyor under which the base frame may be rolled. In this alternative mounting arrangement, the power drive control 102 may be conveniently mounted on the side frame.

The components of the machine 20 and particularly those which contact the material being dispensed, namely the hopper 21 and grid plates 33 preferably are constructed of stainless steel or similar material which does not corrode, so that the machine may be easily kept in sanitary condition as by steam cleaning. As noted, the motor 61 may be easily and quickly removed so that the other components of the machine may be cleaned without subjecting the motor to the cleaning environment.

It also is noted that machines according to the present invention may be constructed in different widths to vary the output or discharge of the material therefrom, and that two or more of the machines may be arranged in endwise and/or staggered relation to increase the width and/or output of materials discharged therefrom. The machines may also be arranged, if desired, in tandem relation with a common drive effecting reciprocal oscillation of the respective grid plates of the machines.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A material dispensing machine comprising a chute for receiving material to be dispensed, said chute having horizontally spaced sides at least one of which is formed by a grid plate made of expanded metal grid material, mounting means for mounting said grid plate for oscillatory movement, and drive means for effecting such oscillatory movement so that material engaged with the expanded metal grid material of said grid plate is separated from adjacent material for passage through and discharge from said grid plate, said grid plate having an inclined upper portion horizontally spaced from an oppositely inclined upper portion of the other side of said chute and a vertical bottom portion closely spaced from a vertical bottom portion of said other side to form an upwardly opening top portion of said chute which downwardly tapers to a narrow vertical channel portion of said chute.

2. A machine as set forth in claim 1 wherein the openings in said expanded metal grid material are substantially diamond shape.

3. A machine as set forth in claim 2 wherein the axes of such diamond shape openings extend upwardly and horizontally.

4. A machine as set forth in claim 1 wherein said grid plate is made of flat expanded metal grid material.

5. A machine as set forth in claim 1 wherein said grid plate is made of raised expanded metal grid material.

6. A machine as set forth in claim 5 wherein bent strands of such raised expanded metal grid material form a cutting edge in one direction of movement of said grid plate.

7. A machine as set forth in claim 1 wherein said grid plate is mounted by said mounting means for horizontal reciprocating movement.

8. A machine as set forth in claim 7 wherein said mounting means includes top and bottom horizontal tracks for guiding the movement of the upper and lower edges of said grid plate.

9. A machine as set forth in claim 8 including antifriction tape fixed within said tracks.

10. A machine as set forth in claim 1 wherein both side walls are formed by grid plates.

11. A machine as set forth in claim 10 wherein said drive means includes means for horizontally reciprocating said grid plates in opposite directions.

12. A machine as set forth in claim 1 wherein said drive means includes a motor, and means for providing a wedge mount for said motor on said chute.

13. A material dispensing machine comprising a chute for receiving material to be dispensed, said chute having horizontally spaced sides which are formed by grid plates made of expanded metal grid material, mounting means for mounting said grid plates for oscillatory movement, and drive means for effecting such oscillatory movement so that material engaged with the expanded metal grid material of said grid plates is separated from adjacent material for passage through and discharge from said grid plates, said gird plates having horizontally spaced, downwardly converging upper portions terminating at closely horizontally spaced bottom portions forming a narrow depending channel.

14. A machine as set forth in claim 13 wherein the upper and lower edges of said grid plates are guided for horizontal movement in top and bottom tracks.

15. A machine as set forth in claim 14 wherein opposite ends of said channel are closed by vertical spacers interposed between adjacent ends of said grid plates.

16. A machine as set forth in claim 15 wherein said vertical spacers support at their bottom ends a generally U-shape channel forming said bottom tracks for said grid plates.

17. A material dispensing machine comprising a chute for receiving material to be dispensed, said chute having horizontally spaced downwardly converging upper side portions terminating at closely spaced vertical bottom side portions forming a narrow depending channel, grid means forming at least one of said upper and bottom side portions of said chute, and means for horizontally reciprocating said grid means to effect refinement of material passing downwardly through said chute.

18. A machine as set forth in claim 17 wherein said grid means includes grid plates forming both sides of said chute.

19. A machine as set forth in claim 17 wherein said grid plates have horizontally arranged solid and grid portions for forming a narrow width discharge pattern.

20. A machine as set forth in claim 19 wherein said grid means includes a grid plate forming one side of said chute while the other side of said chute is formed by a solid plate.

21. A machine a set forth in claim 17 wherein the bottom of said channel is closed.

22. A material dispensing machine comprising a chute for receiving material to be dispensed, said chute having horizontally spaced sides at least one of which is formed by a grid plate having a plurality of openings therein for passage of material therethrough, mounting means for mounting said grid plate for oscillatory movement, and drive means for effecting such oscillatory movement so that material engaged by said grid plate is separated from adjacent material for passage through and discharge from said grid plate, said grid plate having an inclined upper portion on one side of said chute horizontally spaced from an oppositely inclined upper portion of the other side of said chute and a vertical bottom portion on said one side closely spaced from a vertical bottom portion of said other side to form an upwardly opening top portion of said chute which downwardly tapers to a narrow vertical channel portion of said chute.

23. A machine as set forth in claim 22 wherein both sides are formed by grid plates having horizontally spaced downwardly converging upper portions terminating at closely spaced vertical bottom portions forming said narrow vertical channel portion of said chute.

24. A machine as set forth in claim 22 further comprising material receiving means, said chute being mounted at the bottom of said receiving means for separating and dispensing material from said receiving means.

25. A machine as set forth in claim 24 wherein said drive means includes a motor, and means for providing a wedge mount for said motor on said receiving means.

26. A machine as set forth in claim 25 wherein said means for providing a wedge mount for said motor includes a wedge plate supporting said motor, and slot means on said receiving means for wedged receipt of said wedge plate.

27. A machine as set forth in claim 24 wherein said material receiving means comprises a hopper having downwardly converging side walls and spaced apart end walls, said hopper having a bottom discharge opening to said chute.

28. A machine as set forth in claim 27 wherein both sides of said chute are formed by downwardly converging grid plates extending below said bottom discharge opening, said mounting means mounting at least one of said grid plates for oscillatory movement relative to the side walls of said hopper.

29. A machine as set forth in claim 28 further comprising means mounting both of said grid plates for oscillatory movement relative to the side walls of said hopper.

* * * * *